Feb. 6, 1934.                    A. BIRRER                    1,945,930
                          REVERSIBLE GANG PLOW
                        Filed April 25, 1932        2 Sheets-Sheet 1
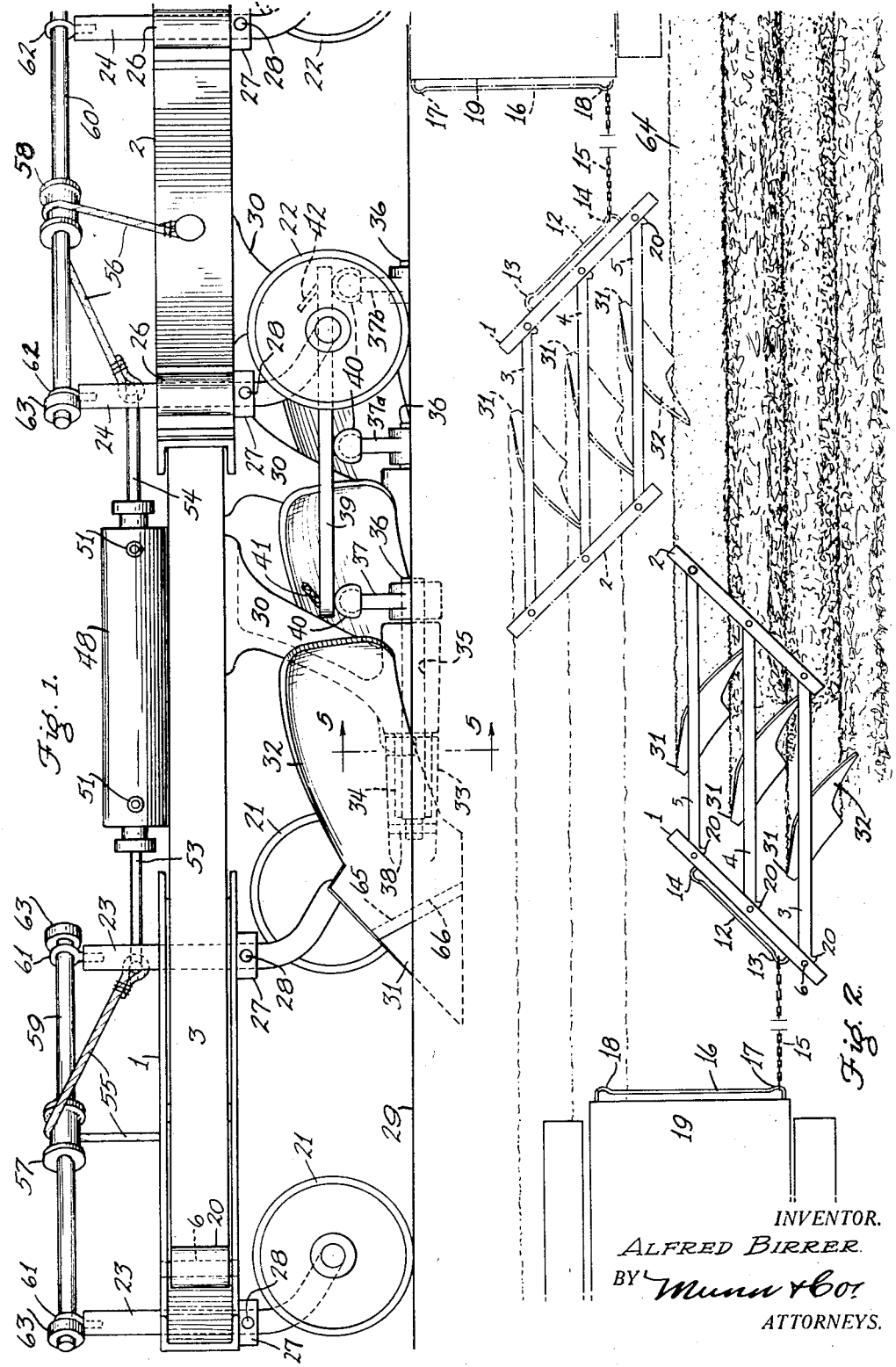
INVENTOR.
ALFRED BIRRER.
BY Munn & Co.
ATTORNEYS.

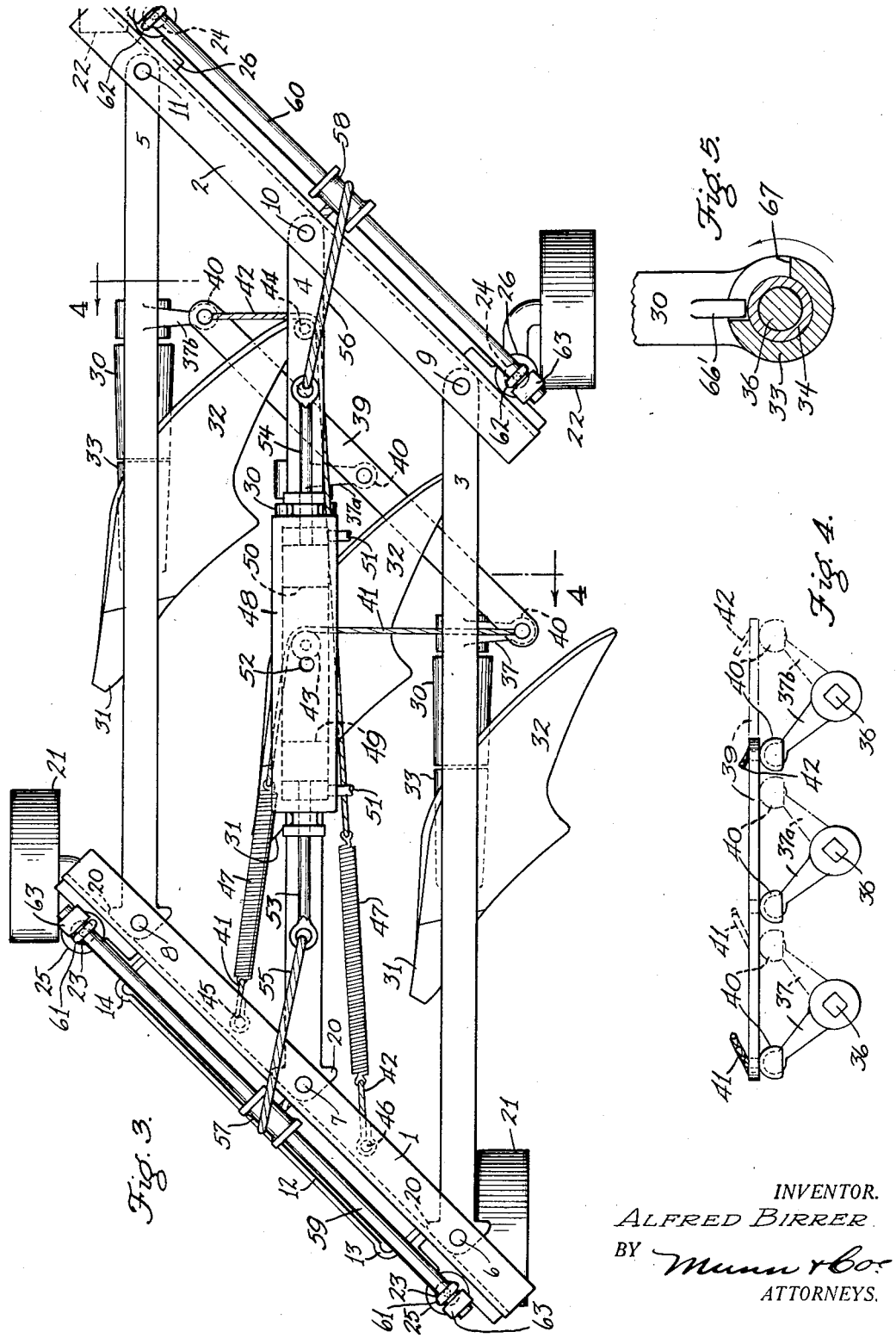

Patented Feb. 6, 1934

1,945,930

UNITED STATES PATENT OFFICE 1,945,930

REVERSIBLE GANG PLOW

Alfred Birrer, Oakland, Calif., assignor of one-half to August Westad, Oakland, Calif.

Application April 25, 1932. Serial No. 607,436

5 Claims. (Cl. 97—31)

My invention relates to improvements in reversible gang plows, and it consists of the combinations, constructions and arrangements hereinafter described and claimed.

An object of my invention is to provide a reversible gang plow, in which the mere turning of the tractor pulling the plow will automatically reverse all of the plow shares and mold boards.

A further object of my invention is to provide a device of the type described, which has novel means for raising all of the plow shares out of the ground prior to making a turn. Novel attaching means is used for securing the plow to the tractor so that the plow shares will be properly positioned behind the tractor.

Other objects and advantages will appear in the following specification, and the novel features of the device will be particularly pointed out in the appended claims.

My invention is illustrated in the accompanying drawings forming a part of this application, in which Figure 1 is a side elevation of the device;

Figure 2 is a diagrammatical top plan view showing the plow attached to a tractor;

Figure 3 is a plan view of Figure 1;

Figure 4 is a section along the line 4—4 of Figure 3; and

Figure 5 is a section along the line 5—5 of Figure 1.

In carrying out my invention, I provide two channel irons 1 and 2, (see Figure 3), that are pivotally connected together by a plurality of plow beams 3, 4 and 5.

It is obvious that more beams can be used if desired, but I have shown only three for the purpose of simplicity.

These beams are pivoted at 6, 7 and 8 to the channel 1, and at 9, 10 and 11 to the channel 2. Figure 2 shows the channel 1 as being provided with a bar 12, having rounded ends 13 and 14. The plow is moved by a chain 15, which has one end connected to the bar 12 and its other end connected to a bar 16 that has rounded ends 17 and 18. The bar 16 is attached to a tractor, indicated generally at 19, and I will describe later on how the mere turning of the tractor will cause the chain 15 to shift from the rounded portions 13 and 17 to the rounded portions 14 and 18, as shown by the dotted lines in Figure 2. Assume that the parts are in the position shown in Figure 3 and that the plow is being advanced to the left by means of the tractor not shown in this figure. The plow beams will prevent further swinging of the channel 1 because stops 20 will bear against the channel. The channels 1 and 2, together with the plow beams 3, 4 and 5, constitute a frame. This frame is supported by front wheels 21 and rear wheels 22, which are mounted on vertical shafts 23 and 24 respectively. The shafts are rotatably received in bearings 25 and 26 that are carried by the channels 1 and 2.

Collars 27 are adjustable on the shafts 23 and 24 and are secured in adjusted position by set screws 28, or similar fastening means. The collars determine the height of the frame above the ground 29.

Each plow beam 3, 4 and 5 has a downwardly-depending member 30, and this member rotatably carries a plow share 31 and a mold board 32. Since all three plow shares are identical, a description of one will suffice. Figure 1 shows a mold board 32 as being provided with a sleeve 33 that is rotatably mounted on a reduced tubular portion 34 of the member 30. The member 30 has a bore 35 therein that extends through the tubular portion 34, and this bore rotatably receives a stub shaft 36.

An arm 37 is secured to one end of the shaft 36 and the other end is secured to the sleeve 33 by means of a pin 38, or other suitable fastening means. It will be seen from this construction that a rocking of the arm 37 through an angle of ninety degrees will swing the plow share 31 and the mold board 32 from the position shown by the full lines in Figure 2 into the position shown by the dotted lines in the same figure.

I provide novel means for causing the swinging of the channels 1 and 2 from the full-line position shown in Figure 2 into the dotted-line position shown in the same figure for swinging the plow shares and mold boards. It will be noted from Figures 1 and 4 that the arms 37, 37a and 37b are connected to a common bar 39 by ball and socket joints 40. It will further be seen from Figure 3 that cables 41 and 42 are connected to the ends of the bar 39 and are passed around idlers 43 and 44 carried by the underside of the plow beam 4 and these cables and their free ends are secured to the channel 1 at 45 and 46 respectively. It will be seen that the cables cross each other and that each has a spring 47 to take up slack.

The means for lifting the plow shares out of the ground comprises a cylinder 48 (see Figures 1 and 3), mounted on the beam 4 and carrying pistons 49 and 50. Fluid inlet pipes 51 enter the ends of the cylinder, and an exhaust opening 52 is disposed midway between the ends of the cylinder. The pistons 49 and 50 are connected to piston rods 53 and 54 and these rods have cables 55 and 56 secured thereto, these cables being passed over pulleys 57 and 58, which are mounted upon shafts 59 and 60, the shafts in turn being rotatably received in eyelets 61 and 62. The eyelets in turn are rotatably received in the tops of the shafts 23 and 24. Collars 63 may be secured to the ends of the shafts 59 and 60 to prevent the longitudinal movement of the shafts with respect to the eyelets. The free ends of the cables 55 and 56 are connected to the channels 1 and 2.

From the foregoing description of the various parts of the device, the operation thereof may be readily understood.

Assume that the tractor 19 is moving the plow to the left in Figure 2, as shown by the full lines. The plow shares will dig into the ground in the manner indicated, and the share 31, carried by the beam 3, will be disposed directly in back of the left-hand side of the tractor. When the tractor reaches the end of the row, the operator admits fluid to the pipes 51 (see Figure 3), by any means not shown, and this fluid will cause the pistons 49 and 50 to move toward each other and to lift the channels 1 and 2. This will remove the plow shares from the ground. The operator now turns the tractor in a clockwise direction and this will first cause the chain 15 to move from the recess 13 to the recess 14. A further turning of the tractor will cause the chain 15 to move from the recess 17 to the recess 18. When, now, the tractor starts in the opposite direction from that formerly taken, the plow will be turned, and, moreover, the channels 1 and 2 will be swung into the angular position shown by the dotted line in Figure 2. This swinging of the channels 1 and 2, together with the beams 3, 4 and 5, will cause the cable 41 to pull upon the link 39 and the arm 37 to swing these parts into the dotted-line position shown in Figure 4. The movement of the link will cause the other arms 37a and 37b to swing in the same manner. This will cause the plow shares to face in the opposite direction. During this movement, the cable 42 is slackened so as to permit the arm 37b to freely swing from the full-line position into the dotted-line position shown in Figure 4. The springs 47 automatically take up any slack in the cables.

The operator of the tractor can now guide the plow into a position where the plow share 31, carried by the beam 5, will be disposed adjacent to the last furrow 64. The fluid pressure in the conduits 51 can now be released, and the weight of the plow frame will cause it to lower on the vertical shafts 23 until it rests on the adjustable collars 27.

A further movement of the plow will now cause the plow shares to dig furrows which will parallel those formerly made. Moreover, the dirt will be thrown in the same direction.

The plow share preferably has a tongue 65 that enters a groove 66 in the mold board 32. Each member 30 has a projection 66' for entering a slot 67 in the sleeve 33. The projection abuts against the ends of the slot and limits the swinging of the sleeve. In this way, the plow share is correctly positioned.

While I have shown only the preferred form of my invention, it should be understood that various changes or modifications may be made within the scope of the appended claims without departing from the spirit of the invention.

I claim:

1. The combination with a tractor having an elongated bar extending transversely thereto, a plow frame swingable into two positions and having a bar, connections between the bars and free to move from end to end thereof, said frame being swingable into one position when the connection exerts a pull at one end of the frame bar and into another position when the connection exerts a pull at the other end of the bar, plow shares carried by the frame and being swingable into two positions, and means connecting the shares with the frame for simultaneously swinging the shares when the position of the frame is changed.

2. In a gang plow, a plurality of plow beams, a plow share rotatably carried by each beam, an arm for rotating each share into either one of two positions, a link connected to all of the arms, a frame for supporting the beams and swingable into two positions, and connections between the link and the frame for causing the link to simultaneously swing all of the shares when the shape of the frame is altered.

3. In a gang plow, a plurality of plow beams, a plow share rotatably carried by each beam, an arm for rotating each share into either one of two positions, a link connected to all of the arms, a frame for supporting the beams and swingable into two positions, connections between the link and the frame for causing the link to simultaneously swing all of the shares when the shape of the frame is altered, and means for raising the shares out of engagement with the ground.

4. In a gang plow, a plurality of plow beams, a plow share rotatably carried by each beam, an arm for rotating each share into either one of two positions, a link connected to all of the arms, a frame for supporting the beams and swingable into two positions, connections between the link and the frame for causing the link to simultaneously swing all of the shares when the shape of the frame is altered, and means for limiting the swinging movement of the shares.

5. A gang plow comprising two end members, plow beams pivotally connected to the members and forming a frame with the members, plow shares rotatably connected to the beams, arms for swinging the shares, a link connected to the arms, cables connecting the frame with the link for swinging the shares when the shape of the frame is altered, wheels for supporting the frame, and means for raising and lowering the frame with respect to the wheels.

ALFRED BIRRER.